Dec. 26, 1933.      C. L. JOHNSON      1,941,212
MEANS FOR THE PREPARATION OF MICA PRODUCTS FROM SCRAP MICA
Filed Sept. 11, 1929      6 Sheets-Sheet 1

Witnesses:
C. E. Wessels
F. C. Appleton

Inventor:
Conrad L. Johnson,
By Joshua R. H. Potts
his Attorney.

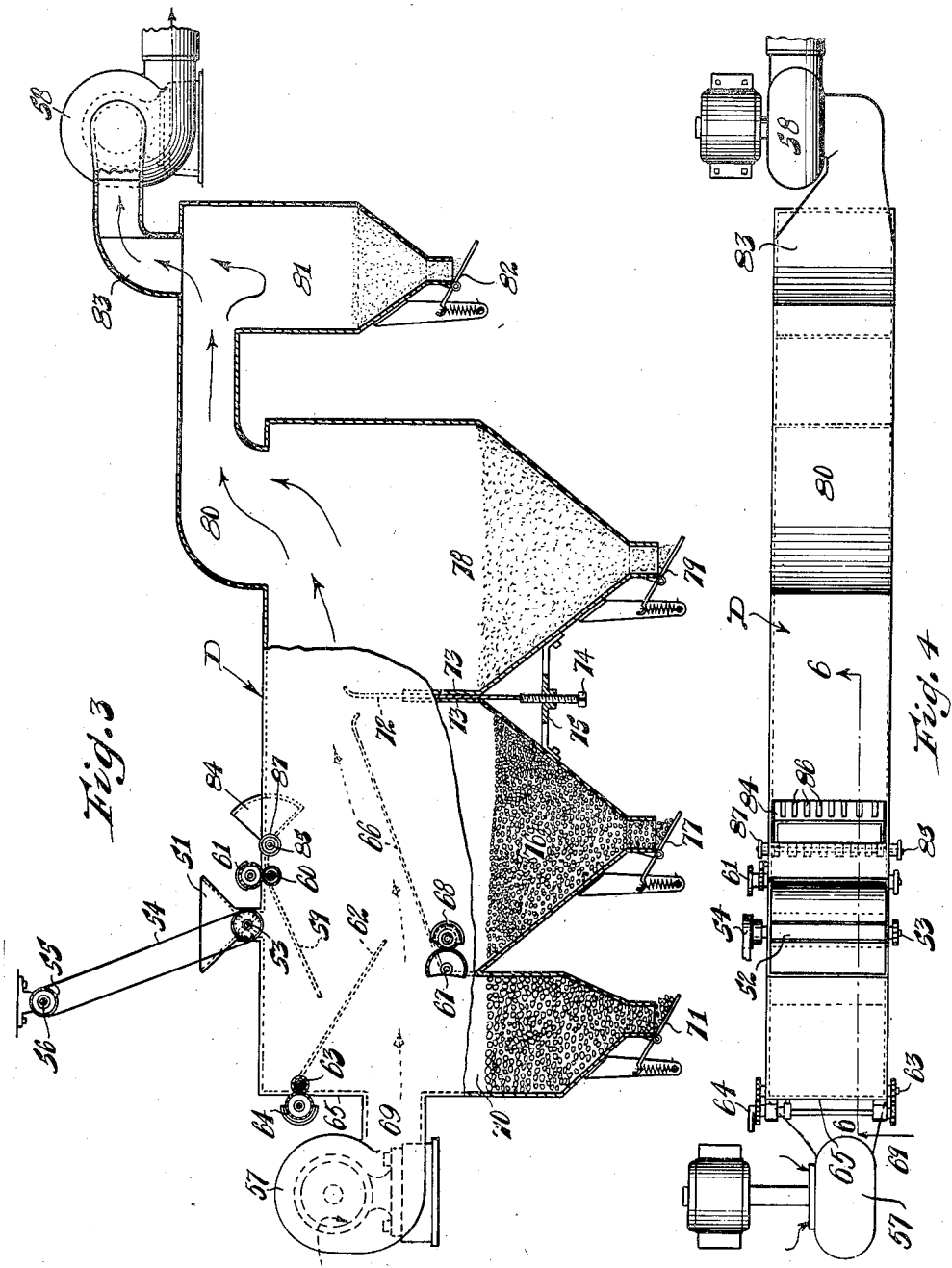

Dec. 26, 1933.   C. L. JOHNSON   1,941,212
MEANS FOR THE PREPARATION OF MICA PRODUCTS FROM SCRAP MICA
Filed Sept. 11, 1929   6 Sheets-Sheet 4
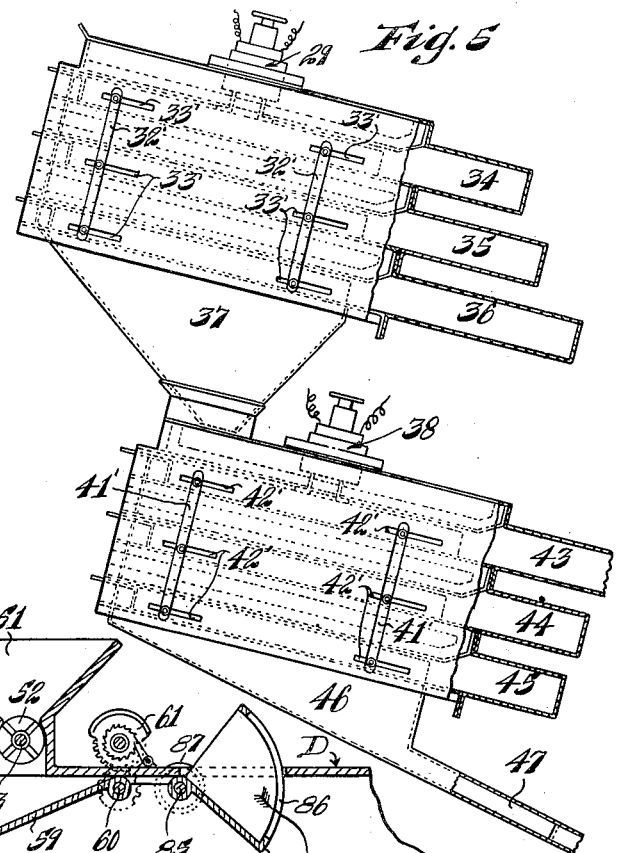
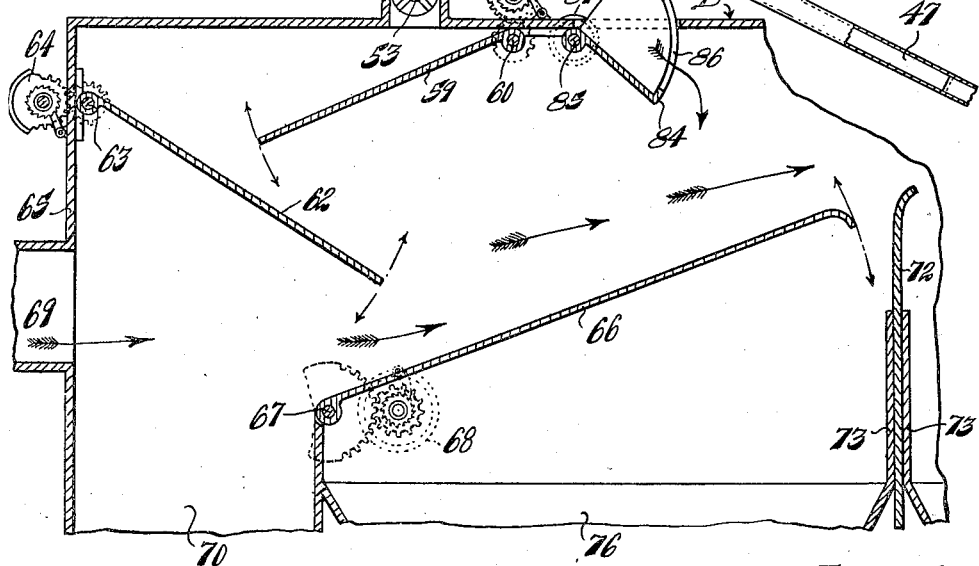
Inventor:
Conrad L. Johnson,
By Joshua R H Potts
his Attorney.
Witnesses:
C. E. Wessels
J. C. Appleton Dec. 26, 1933.   C. L. JOHNSON   1,941,212
MEANS FOR THE PREPARATION OF MICA PRODUCTS FROM SCRAP MICA
Filed Sept. 11, 1929   6 Sheets-Sheet 5
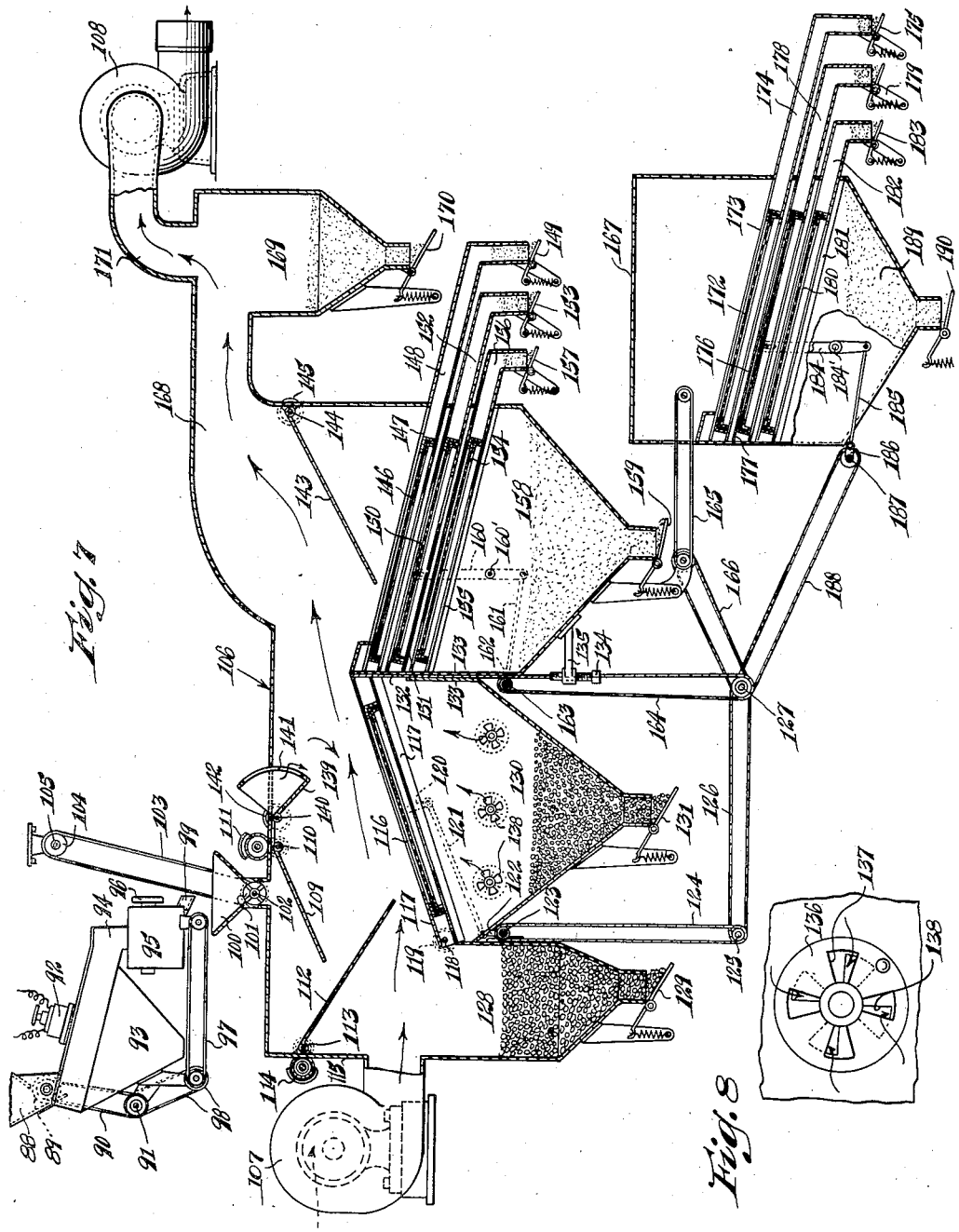
Witnesses:
C. E. Wessels
F. C. Appleton
Inventor:
Conrad L. Johnson,
By Joshua R. H. Potts
his Attorney.

Dec. 26, 1933.   C. L. JOHNSON   1,941,212
MEANS FOR THE PREPARATION OF MICA PRODUCTS FROM SCRAP MICA
Filed Sept. 11, 1929   6 Sheets-Sheet 6

Witnesses:
E. E. Wessels
F. C. Appleton

Inventor:
Conrad L. Johnson,
By Joshua R H Foth
his Attorney.

Patented Dec. 26, 1933

1,941,212

UNITED STATES PATENT OFFICE 1,941,212

MEANS FOR THE PREPARATION OF MICA PRODUCTS FROM SCRAP MICA

Conrad L. Johnson, Chicago, Ill.

Application September 11, 1929
Serial No. 391,868

4 Claims. (Cl. 209—2)

This invention in general relates to an improved means for the cleaning, separating and disposing of mica into classified groups of particles of varying grades of fineness, and more particularly to a means for the utilization of mica waste and the preparation and sorting of same into diverse classes suitable and appropriate for the widely different needs of the various arts.

The object of the invention is to provide highly improved and efficient apparatus for preparing, sorting, cleaning, classifying, etc. scrap mica into forms for which a demand exists in construction work and as an essential constituent of many preparations employed in the various arts.

Another object is to utilize and create a market for the immense deposits of waste or scrap mica which heretofore has been dumped aside as waste material of no value.

A further object is to provide apparatus for utilizing scrap mica in a manner to optionally include or discard foreign material and rock particles with the mica during the various grading and sorting operations.

The invention as a whole contemplates and provides for the preparation of marketable mica products from scrap mica by three different methods, each of which embodies certain features best adapted for the achievement of the object in view by the particular process employed.

According to the first method employed in the present application, the scrap mica is given several preliminary mechanical sortings before being subjected to an air blast for further separating and grouping into respective classes of graded particles differing according to size, and in addition to the mechanical sortings, a crushing and splitting treatment.

The second method broadly contemplates the simultaneous application of a blast of air to the mica particles while being mechanically agitated during the classifying and sorting operations.

In the third method the air blast is dispensed with, the various preparing and sorting operations being purely mechanical, the products by the nature of this method including a certain percentage of dust or foreign material, which in some instances, as will be hereinafter pointed out, are required in the preparation of certain compounds. These three methods together with the apparatus employed and the general features of the invention will be pointed out more fully in the details hereinafter set forth, reference being had to the accompanying drawings, in which Fig. 1 is a top plan view of an entire assembly for the preparation of mica by method number one, this assembly comprising all the units necessary for the achievement of the end in view;

Fig. 3 is a section on line 3—3 of Fig. 1 illustrating one of the air classifying units;

Fig. 4 is a plan view of the apparatus shown in Fig. 3;

Fig. 5 is an elevational view, partly in section, of the electrically actuated classifying screens;

Fig. 6 is an enlarged sectional view, partly in elevation, taken on line 6—6 of Fig. 4, illustrating the adjustable baffle plates employed in one of the air classifying units;

Fig. 7 is a longitudinal sectional view of an air classifying unit together with an associated feeding unit mechanically actuated screen separating means;

Fig. 8 is an elevational view of one of the air valves employed for regulating the intensity of the draft through the unit shown in Fig. 7.

Figure 1:
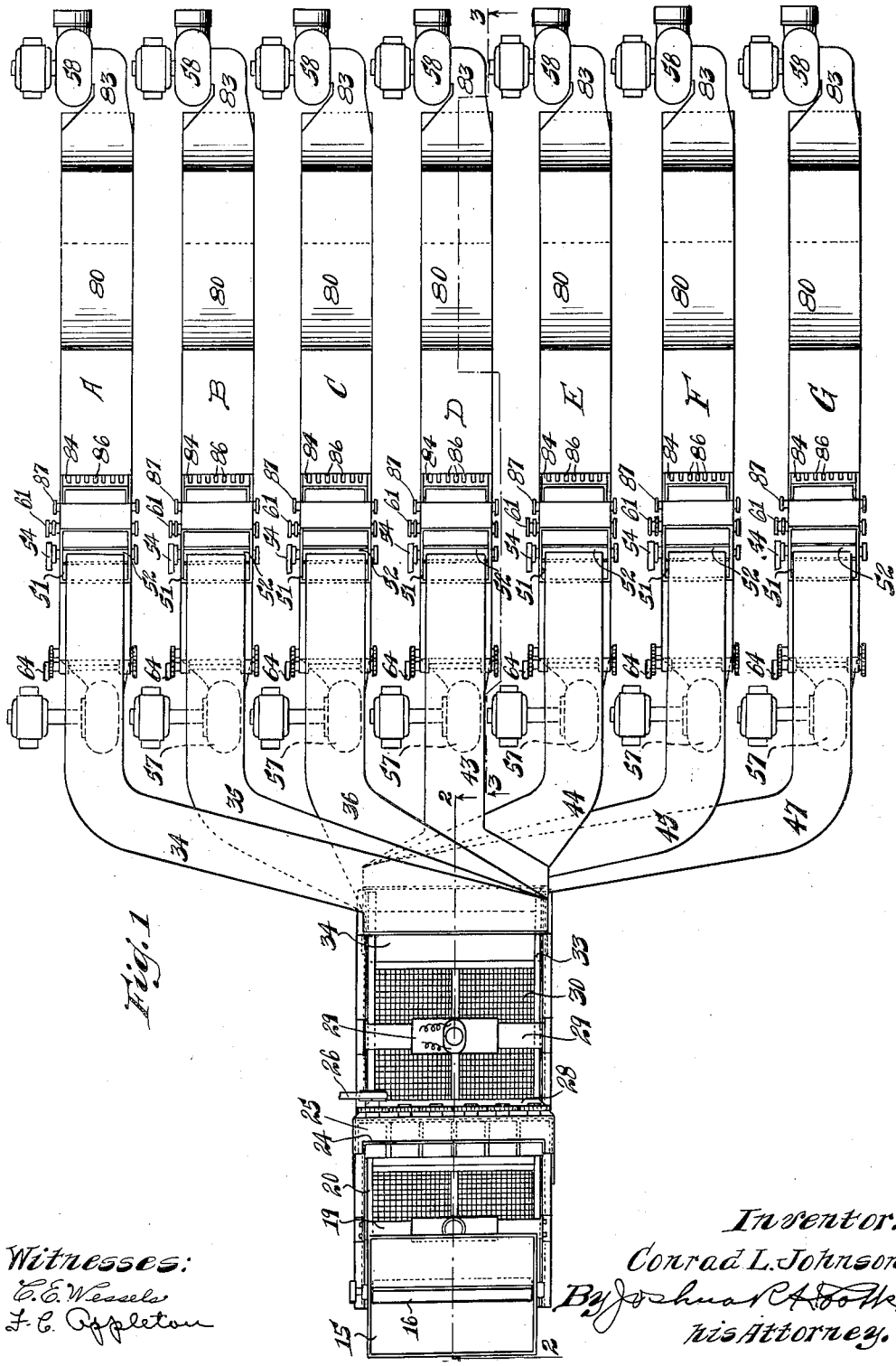

With more particular reference to the drawings in which similar characters of reference indicate corresponding parts in the form of my invention comprised under the first method, 15 designates a feeding hopper which receives waste or scrap mica disposed therein, this hopper having a star wheel 16 which is operated by a belt and pulley 17 connected to a power driven shaft 18. Throughout the specification, it will be understood that by the term waste or scrap mica, I include the refuse material dumpings from the mica quarries which are composed of mica fragments and particles, intermingled with rock fragments and particles. An electro-magnetically operated screen 19 reciprocates in guide members 20 which are mounted on and contiguous to a hopper 21 wherein the material preliminarily passing through the screen 19 falls, being conveyed thence on an endless belt or traveling conveyor 22. The endless conveyor 22 is actuated from a counter-shaft 23 which is connected to the power driven shaft 18 in a conventional manner. A second hopper 24 receives the larger particles of material from the screen 19, to be subjected to the action of a crusher 25 which has a plurality of gears and a pulley connected to a belt 26 mounted on a pulley fixed to a counter-shaft 27. Leading from the second hopper 24 is a discharge spout 28 from which the mica material passing through the crusher 25 falls onto an electro-magnetic agitator 29 which serves to oscillate the reciprocatory classifying or sorting screens 30, 31 and 32 which oscillate in guide members 33, these screens being inter-connected by links 32' through slots 33', as best shown in Fig. 5. Each of the screens 30, 31 and 32 is connected to a corresponding conduit 34, 35 and 36 which discharge material into the air classifying units A, B and C, respectively, as clearly shown in Fig. 1, these air classifying units forming part of the group of units which are designated as A to G inclusive.

A hopper 37 receives all that grade of material which is of fineness of particle sufficiently to pass through said series of screens 30, 31 and 32, this material being now permitted to fall from the hopper 37 onto an electro-magnetic classifier 38 having a similar series of screens 39, 40 and 41 which reciprocate in guide members 42, the screens being inter-connected by links 41' through slots 42' (see Fig. 5), these links and slots permitting the group of screens to be reciprocated simultaneously as a whole or, if desired, a single screen may be actuated by disconnecting the other two from the links which may be done by merely unscrewing the bolts fastening same thereto. The larger particled material arriving on the top of screen 39 is transferred from the oscillating screen to the upper conduit 43, and in a similar manner that grade of mica material which passes through the upper screen and is received on the second screen 40 is transferred thence to the conduit 44, and so on with screen 41 and conduit 45. Siftings passing through all the screens 39, 40 and 41 will fall into hopper 46, thereby being conveyed thence through conduit 47 to an air classifying unit G, while the products in the respective conduits 43, 44 and 45 pass to a series of air blast units D, E, and F of a type similar to that described in connection with units A, B and C.

Figure 2:
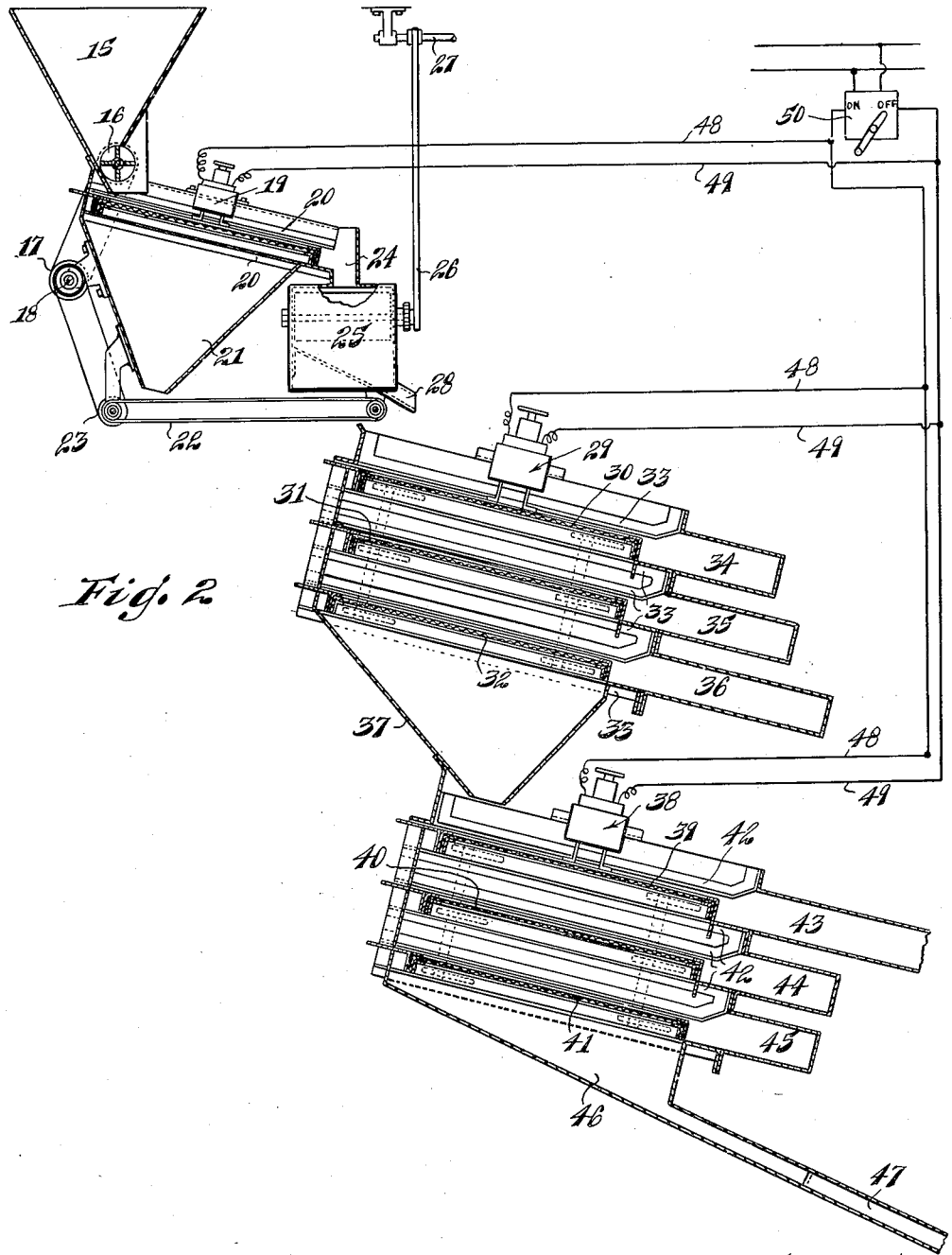
Fig. 2 is a sectional view, partly in elevation, of the feeding hopper, electrically actuated screen agitator, crusher machine, classifying screens and conduits connected thereto, and other associated parts.

The electro-magnetic actuating elements of the agitators 19, 29 and 38, as shown in Fig. 2 are conveniently operated by current supplied through wires 48, 49 connecting these units to a control box 50. It might here be observed that all the classifier units designated from A to G inclusive, are of similar construction, the screens, however, associated with each progressively being of finer mesh, thereby insuring a finer gradation of the mica products as they pass from one screen to the other. The several units A to G, as best shown in Figs. 1 and 6 are provided with feeding hoppers 51, each hopper being connected with one of the conduits 34, 35, 36, 43, 44, 45, and 47, through which the material is delivered to the respective units. The respective hoppers 51, as clearly shown in Fig. 6, have star feeding wheels 52 which are mounted on shafts 53, these shafts having a pulley and belt drive 54 connected to a pulley 55 on a power driven shaft 56 (see Fig. 3). All of the units from A to G are provided with blower fans 57 at the forward end, these fans cooperating with coacting exhaust fans 58, whereby a suitable draft is created within each unit which serves to diffuse and scatter the particles of mica and direct them into hoppers or bins wherein the mica is uniformly graded in size of particles, as will hereinafter be described more fully.

Material from the feeding hoppers 51 is discharged on baffle plates 59, there being a similar baffle plate in each of the units A to G inclusive, these baffle plates being secured on shafts 60 which are mounted in the housings of the respective units A to G, mentioned above. The baffle plates are manually operated by gear and ratchet units 61, which permit angular adjustment of the baffle plates to any desired degree. It will be seen that material dropping on baffle plate 59 will gravitate onto a second adjustable baffle plate 62 which is fixed to a shaft 63 suitably mounted in one end of the housing, this shaft having a similar gear and ratchet operating assembly 64 which, as shown, is situated at the front end of the housing. The mica material is spread and diffused by these cooperating baffle plates 59 and 62 to a sloping plate 66 which is fixed to a shaft 67 supported in the unit housing, the angle of inclination of this plate 66 being determined by the operator who manipulates the associated gear and ratchet assembly 68 (see Fig. 3). Communicating with the housing of the unit is a conduit 69 through which a blast or draft of air from the blower 57 is directed onto the inclined plate 66. In this connection it may be observed that relatively large and comparatively heavy particles of rock will by gravity roll down the inclined plate against the resistance of the air, to be received in an associated hopper 70. These particles of rock although generally considered as waste are of use in some of the arts, particularly the building trades. The hopper 70, as best shown in Fig. 3, has a spring held gate or valve 71, the tension of this gate or valve being adjusted so that it will preferably retain sufficient material in the hopper to serve as a check against a too free entrance of air therein. However, when sufficient material is accumulated, the gate or valve will open automatically against the tension of the spring and permit a certain amount of material to be discharged from the hopper into any suitable receptacle placed thereunder for the purpose. A vertically adjustable stop plate 72 coacts with the inclined plate 66, this plate 72 being slidable between supporting plates 73, which latter may be formed unitary with parts of the hoppers or bins into which the graded particles of rock and mica are directed by the air blast through the unit D and likewise through the similarly arranged and operated units A to G, respectively.

The adjustable stop plate 72 at its lower end is obviously connected to or supported on an adjusting screw 74 threaded in a bracket 75 secured to corresponding adjacent walls of hoppers 76 and 78 into which particles of mica are driven by the air blast through the unit. The hoppers 76 and 78 likewise have spring held gate valves 77 and 79, respectively, whose purpose and function is the same as that described in connection with the gate valve 71 of hopper 70. A tube 80 communicating with the chamber in the housing, in a plane above the bins 70, 76 and 78, conveys a mica-laden blast of air to the exhaust fan 58, this blast of air passing over a bin 81 having a spring-actuated valve 82. The particles of dust themselves pass directly out of the unit through the conduit 83 and blower 58 into the outer atmosphere, this being one of the features of my invention which provides not only means for disintegrating, separating and sorting mica into uniform grades of various degrees of fineness, but also insures the removal of dust and foreign material therefrom. A regulating damper 84 fixed on a shaft 85 (see Figs. 1, 3, 4, and 6) is provided for each of the units A to G, each of these dampers having slots 86 and an adjusting handle 87. From an inspection of Figs. 3 and 6 it will be seen, that in proportion as the damper 84 is swung inwardly, the greater will be the opened area of said slots 86 through which air may enter into the interior of the unit, in this manner the intensity of the draft through the unit being lessened as the comparative vacuum in the chamber is more or less equalized by atmospheric pressure entering through the damper.

The details hereinbefore described comprise an apparatus well adapted for producing mica products from mica waste by my first method. In this method, it might be noted that mica waste, which may be of the usual variety to be found on the dump heaps of the various mica quarries and mills which are engaged in preparing sheet mica from the ore in its crude form, is first received in the hoper 15, whence it is fed successively to the graduated screens or sifting cloths which at first are of comparatively large mesh, and are vibrated by the series of electro-magnetic agitators 19, 29 and 38 which for this purpose have been found to be very efficient for oscillating an inclined screen to cause mica to fall into any suitable receptacle associated therewith. The preliminary operations of the first method before the units A to G are reached as outlined in Figs. 1, 2 and 5 are purely mechanical, the pneumatic means being preferably brought into play after the grading of the combined rock particles and mica particles has been accomplished by the several screening processes indicated above. It will be noted that the method and process here indicated may be expanded indefinitely within reasonable limits, since the output of the hoppers or bins 37 and 46 are conveyed by their associated conduits or chutes to mechanism which forms a part of the series of pneumatic units A to G inclusive.

Prior to the application of the pneumatic grading means or air blast of the units A to G, it will be observed that rock and mica particles are intermingled. I deem it preferable in accordance with the features of method number one to accomplish the preliminary grouping of the mica and rock particles, since it facilitates a more efficient separation of the mica particles from the rock by the air blast units A to G inclusive. Assuming, as in the present instance, that mica and rock particles pass through the several screens of the device, as shown in Fig. 2, and the separate graduated masses thereof are delivered to the respective air blast units, the material falling from the feeding hopper 51 for each unit onto the adjustable baffle plate 59 (see Figs. 3 and 6) will then gravitate to adjustable baffle plate 62 and thence drop onto plate 66, during which latter fall the blast of air created by fans 57 and 58 strikes the mass. The comparatively heavy particles of rock, as mentioned above, despite the draft, will roll down the inclined plate 66 into the bin 70, while particles of rock not quite as heavy will ascend the inclined plate 66 and fall into the gap between the latter and the vertically adjustable plate 72. The mica particles, however, being much lighter will be carried floatingly on the air blast forward to bin 78, which receives the heavier of these particles. The bin 81 serves as a receptacle for the lighter mica material passing into the tube 80, while dust which is of still lighter constituency passes directly into the outer atmosphere through the exhaust fan 58. The regulation of the damper 84, as pointed out above, plays an important part in determining just how much draft is sufficient to achieve the desired end without being excessively strong, in which latter case, rock particles would be blown along with the mica into bin 78 while part of the mica itself might be carried directly into the outer atmosphere through the exhaust fan.

Contemplated in my second method is the preparation of mica products from waste mica by utilizing a feeding hopper 88 (see Fig. 7) which is of the same type as feeding hopper 15, this hopper being also provided with a star feeding roller 89 driven by a belted pulley element 90 by means of a driving shaft 91. An electro-magnetic agitator 92 communicates with a bin or hopper 93 while large rock particles are conveyed, in the manner indicated in connection with method one, from a discharge spout 94 into a crusher 95 which is driven by a belt and pulley 96 obviously connected to a suitable source of mechanical energy (not shown). The output of hopper 93 is received on an endless conveyor 97 which is driven by a belt and pulley 98 from the main driving shaft 91, material being carried by the conveyor to a feeding hopper 100 having a feeding roller 101 actuated by a shaft 102 which is connected to a belt 103 which passes over a pulley 104 on a power shaft 105. The classifying unit 106 which receives the output of material from hopper 100, comprises a blower fan 107 and a coacting exhaust fan 108. Material from hopper 100 disgorged by feeding roller 101 falls onto a baffle plate 109, which is of similar construction to the baffle plate described in connection with method one, the present baffle plate 109 being mounted on a shaft 110 which has a manually operated gear and ratchet feeding arrangement 111 similar to the unit 61.

A second baffle plate 112 mounted on a shaft 113 is likewise operated by a manual control handle 114 which is secured on the front wall 115 of the device. Material falling from baffle plate 109 upon baffle plate 112 is received thence by the adjustable screen 116 which reciprocates in guide rails 117, this last mentioned screen being pivoted on a shaft 118 having an operating handle 119 by which the reciprocating screen can be adjusted to any desired angle of elevation while reciprocating. In actual practice the angle of elevation of the screen plays an important part in the amount and nature of the material produced by the machine, as will be readily understood. An arm 120 is secured to the adjusting screen 116, this arm being rockingly connected to a link 121 which is connected to a crank arm 122 on a shaft 123 suitably mounted in bearings in the housing of the separator or classifying unit 106. The shaft 123 is connected by a chain and sprocket arrangement 124 to a shaft 125 which likewise has a chain and sprocket connection to a power driven shaft 127. It will now be noted that material sifted by agitation of the screen 116 will result in larger particles of rock gravitating into a hopper 128 where predetermined quantities are retained by the gate valve 129, in the manner outlined in connection with method number one. Finer particles of material will be carried forward by the blast created by the fans 107, 108, some of the finer particles of mica and rock falling into the hopper 130 having a spring held valve 131 of similar purpose and function to those hereinbefore described. A shoe 132 is confined between plates 133, this shoe being vertically adjustable by means of the screw 134 connected thereto and supported by a bracket arm 135 from another part of the housing 106. A plurality of rotary disks 136, which have ports or openings 137 registering with corresponding ports or openings 138 formed in the side walls of the housing 106, are provided, these ports serving to lessen the intensity of the draft within the bins or hoppers containing the sifted material. It is to be observed, that as a blast of air passes through the housing 106 over the bins 128, 130 and other bins within the housing to be described, dust particles within these bins will be drawn upwardly through the screening to be carried through the housing along with the blast and thence by the exhaust fan 108 into the outer atmosphere.

A damper 139 which is of the same type as damper 84, is fastened to a shaft 140, the damper having slots or openings 141 and an operating handle 142. This damper serves the same function as that outlined with reference to damper 84 and serves to decrease the intensity of the blast through the housing 106 in proportion as the damper is angled downward, thereby bringing the ports or openings into play for the freer entrance of the outside air. Particles of mica which are carried by the blast onto the adjustable baffle plate 143 which is fixed to shaft 144 having an operating handle 145, will in part fall on reciprocating screen 146 which oscillates in guide members 147. The larger particles of mica will be precipitated from the screen 146 into the conduit or chute 148 to be conveyed thence to the spring held valve 149. Particles of material pass through the screen 146 and fall on a reciprocating screen 150 which likewise vibrates in guide members 151 fastened to a part of the bin. The larger particles of material that will not pass through this latter screen are precipitated into the chute 152 and thence onto the spring held valve 153. Also the third oscillating screen 154 reciprocating in guide members 155 will convey the particles too large to pass therethrough into chute 156 and thence to spring controlled valve 157. Those particles of material which pass through the three screens 146, 150, 154, will fall into the hopper 158 which has the usual spring held valve gate 159. It will be observed that the three screens last enumerated are simultaneously vibrated by an arm 160 rockingly mounted on a shaft 160' having at its lower end a pivotal connection to a link 161 which is connected to a small crank arm 162 on a shaft 163 which is operated by chain and sprocket mechanism 164 which has a connection to the power driven shaft 127.

Below the valve gate 159 is an endless conveyor belt 165 which is connected to a pulley operated by a chain and sprocket 166 of the type last described and also having a connection to the common power shaft 127. The conveyor belt 165 carries the mica particles into the sifting bin 167 where a further series of siftings occur, the function of which will be set forth hereinafter. Reverting to the sorting of the mica continuously occurring in the housing 106, it will be observed, that the blast created by the fans 107 and 108 will carry comparatively light particles of dust which have not passed through the several screening cloths into an outlet conduit 168. A considerable part of the dust will be precipitated into a bin 169 having an outlet gate 170, while very fine particles of dust will float with the draft and pass to the outside atmosphere through the pipe 171 immediately connected to the exhaust fan 108.

The hopper or bin 167 into which the fine siftings from the hopper 158 are conveyed has a plurality of oscillating screens, the top one of which 172 is confined in guides 173, this screen communicating with chute 174 to spring-held valve 175. The two other screens 176 and 180 are likewise slidably confined in guides 177 and 181, respectively, similar to the guides 173, the screen 176 communicating with a chute 178 having a terminal gate valve 179, and the screen 180 with a chute 182 provided with the valve 183. The three screens last enumerated, i. e., 172, 176 and 180, may be simultaneously oscillated by a connection to an arm 184 rockingly mounted on a shaft 184'; the arm being pivotally connected to a link 185 in turn connected to a small crank arm 186 fastened on a shaft 187 driven by a sprocket and chain arrangement 188 from the power shaft 127. Fine material passing through screens 172, 176 and 180 will fall into the bottom 189 of the hopper 167, and be releasably detained by the spring held gate valve 190. The series of oscillating screens in bins 158 and 167, it will be noted, are for all general purposes simultaneously oscillated. However, should it be desired to confine the siftings to a lesser number, it will merely be necessary to detach the arms 160 and 184 from those screens which it is desired to render inactive. The general operation of the apparatus outlined in my second method has been in large measure indicated by the detailed description of the associated parts of this form of the invention. To carry out the object of this form of the invention I have found it preferable, immediately after the feeding of the waste mica material into the housing 106, to combine the pneumatic classifying means with the mechanical agitation attained by the several screen oscillating operations.

In the present method, the products are almost immediately freed from dust and light foreign material, as the mica itself, by reason of its comparatively flaky nature, offers much less resistance to the draft and consequently is much more readily conveyed along in the blast than the associated rock particles, the heavier of which are immediately extracted and delivered into the bin 128 and thence drawn off through gate valve 129 from the accumulated store in bin 128. Particular attention is directed to the function and effect of the adjustable dampers or draft regulators 138 which, by admitting atmospheric air, cause an upwardly directed current of air to strike and pass through the adjustable screen 116 from underneath, thereby lifting the lighter mica particles and practically all of the dust intermingled therewith. It may here be mentioned that in many manufacturing operations it is desirable to have mica free of dust or foreign material, which is provided for by this second method of mine, whereas in certain forms of mixtures and compounds used in construction work, it has been found actually preferable to have a certain amount of dust or foreign material intermingled with the mica particles to serve as a species of binding material thereof. The latter object is achieved in my third method which will now be described.

Figure 9:
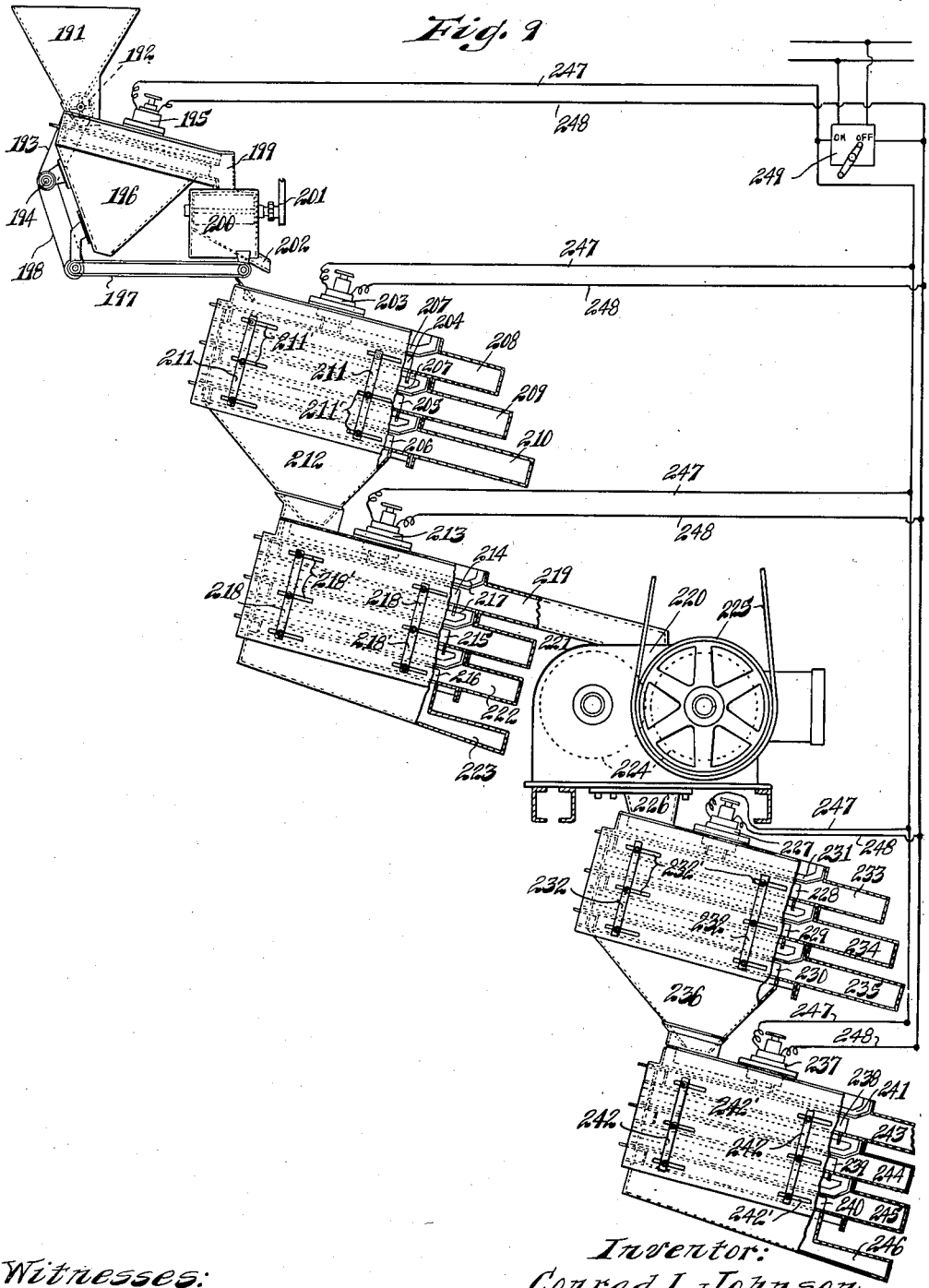
Fig. 9 is an elevational view, partly in section, of the feeding hopper, electrically actuated agitating screens, classifying units and crusher devices.

The third method or form of my invention contemplates the preparation of mica without auxiliary pneumatic means, the products being prepared by purely mechanical siftings and having as a consequence a certain slight percentage of dust or foreign material intermingled therewith. This inclusion of extraneous matter has certain points of utility, as pointed out above. The mechanism for obtaining the mica in this third form of the invention (see Fig. 9) comprises a receiving hopper 191 having a feeding roller 192 driven by a belt and pulley 193 connected to a shaft 194. The finer materials passing through the vibrating screen of the agitator 195 pass through the hopper 196 and fall thence on the conveyor belt 197 which is driven by a belt and pulley 198 connected to the driving shaft 194. The coarser material immediately precipitated on the electro-magnetic agitator 195 is preliminarily conveyed therefrom through a chute 199 to a power driven crusher 200 which is preferably of a different type than the roller type. The crusher 200 is operated by a belt 201 connected to a suitable source of power (not shown), and is provided with an outlet spout 202. At this point the material deposited by the endless belt 197 meets the material passing through the crusher 200, which is discharged through the spout 202. Both the screened products and the crushed products therefore are deposited onto a second electro-magnetic screen vibrator 203 having a plurality of oscillating screens 204, 205 and 206 which reciprocate in guides 207, these screens respectively communicating with conduits or chutes 208, 209 and 210. The screens 204, 205 and 206 are interconnected by a pair of links 211 which are preferably adjustably and removably secured to the oscillating screens by bolts received in the pair of links and thence passed through the slots 211' provided therefor in the screen housing as shown in Fig. 9.

When it is desired to render inactive any of the oscillating screens last enumerated it will merely be necessary to remove the bolts from that screen, thus rendering it idle. The partly screened products which have passed through the first series of screens fall into hopper 212 which discharges these products onto an electro-magnetic material vibrator 213 which has a similar series of oscillating screens 214, 215, and 216 reciprocatingly mounted in guides 217, these screens being similarly inter-connected by the parallel links 218 which are attached thereto by means of bolts passed through slots 218' provided in the housing for the screens. A similar number of conduits or pipes 219, 221 and 222 communicate with the respective screens 214, 215 and 216, the uppermost screen 214 discharging its material through conduit 219 directly into a power driven roller crusher 220. It is also to be understood that the material issuing from conduit 208, 209, 210, 219, 221 and 222 are likewise conveyed to the same or individual roller crushers similar to said crusher 220. The particles passing through the three screens 214, 215, and 216 and falling into the chute 223 are in a similar manner conveyed to another electro-magnetic material vibrator which will be described hereinafter. The crusher 220 is provided with a pair of cooperating rollers 224 driven by a belt and pulley 225 from a counter-shaft (not shown). The material that has passed through the roller crusher falls into a chute 226 and is thence directed onto an electro-magnetic material vibrator 227 which is provided with a series of oscillating screens 228, 229 and 230, these screens reciprocating in guide members 231. In the same manner described with reference to the other oscillating screens, the present screens 228, 229 and 230 are coupled by the parallel links 232 which are bolted to the screens through the slots 232' in the screen housing, the function of the assembly being substantially similar to that of the other like units throughout the device. The material excluded by screen 228 is conveyed through conduit 233, this material being a completed product after it has passed through the processes above indicated, as is also the material excluded by the screens 229 and 230. Such material as is excluded by the screens 228, 229 and 230, if it is desired to have completed products of still higher degrees of fineness, however, will be conveyed through their respective connected chutes 233, 234 and 235 for further treatment. Such material as passes through the entire series of screens 228, 229 and 230 will pass through the outlet of the hopper 236, whence, if desired, the mica material may be again conveyed to another electro-magnetically operated agitator 237 with its associated series of oscillating screens 238, 239 and 240, working in guideways 241 and interconnected by links 242 bolted thereto through the slots 242' in the screen housing, said screens respectively communicating with conduits 243, 244 and 245, from which latter issue the resultant graded products of still higher degrees of fineness, while from the chute 246 passes the pulverized rock material which is passed through the entire series of screens 228, 229, 230, 238, 239 and 240. It is to be observed that the rock which is associated with the refuse or scrap mica has practically been reduced to the consistency of a powder by the action of the roller crusher 220, and accordingly it is to be observed that for all practical purposes the finishing of the mica product has been achieved when the material reaches the conduit 233, since that material which passes through the screens 228, 229 and 230 is for the most part merely pulverized rock material and not mica. The rock dust that issues through the bottom of the hopper 236 and from the conduit 246 may be employed for purposes hereinafter mentioned.

Each of the electro-magnetic vibrating agitators 195, 203, 213, 227 and 237 is connected by wires 247, 248 to a suitable source of electrical energy through a control switch 249. It is desired to point out that in view of the great and varied demands existing for mica of all degrees of fineness in the arts, that a need exists for definite grades of mica, these definite grades being hundreds in number and each having a degree of fineness differentiating over the next larger size. For example, in the preparation of paints and pigments it is essential to have the mica reduced to a flour-like consistency, while for such preparations as cements, plastering compounds and roofing material, it is essential that the mica have more body. Also it is desirable in some cases to have rock particles intermingled with the mica as a diluting substance, and again, as pointed out above, a slight percentage of foreign material in the nature of dust, etc. is actually advantageous as a means of rendering the particles of mica less prone to resist a thorough intermingling with other ingredients.

The angle of elevation to which the screen 116 is adjusted in the method outlined in the second form of my invention, will substantially modify the output, both in quantity and the nature of the material obtained in bins 128 and 130, although at this point it is desirable to have comparatively heavy particles of material or rock immediately removed by gravity and precipitated into the bin 128, where they may be discarded as waste and not mica material; or this rock may be subjected to a grinding or triturating process with roller crushers and similar rock and ore comminuting machines in order to serve as one of the ingredients of various cements, pastes and also for application in some of the arts as a grinding or abrasive material. In the mechanical operations outlined in the last method, it is to be observed that the power requisite for effecting comminution of the refuse mica is of necessity greater than that required by the other methods herein outlined which employ air as an auxiliary, since considerable energy and power are required to crush and pulverize the rock intermingled with the mica fragments and particles.

It will be noted the invention in general comprises methods and means for the production of mica products of practically every grade of fineness with or without the addition of foreign material and that further it will be possible to select that process in which a means may be arrived at between the quality or quantity of the output and the price per ton to produce the material.

In the practice of my three methods of preparing mica products from scrap mica, I have found it desirable to obtain a preliminary separation of the rock particles from the mica particles which chiefly is accomplished by the crushers 25, 95 and 200, the chief advantage of this residing in the fact that after passing through the crusher, the rock particles contained in the scrap mica are pulverized and will then easily and quickly be eliminated by gravity when falling on the inclined screening surfaces to be conveyed thence to their appropriate receptacles; whereas the mica particles, being essentially flat fragments, pass through the roller crushers without disintegration in their planes of cleavage, the roller crusher being so designed as to yield or permit a separation of the rollers when a flat object such as a strip of mica passes therethrough; whereas the more friable rock particles are pulverized, as pointed out above, and thence eliminated. After the crushing treatment of the rock and mica particles the air blast has a more direct and efficient action in securing the grading of the mica particles, as set forth in the description and as illustrated in the drawings.

It will of course be understood that many modifications and changes may be made in the mechanical and electrical units embodied in the various processes indicated without departing from the spirit or sacrificing any of the advantages of the invention as set forth; hence, the invention in general is not to be limited to the precise details of construction as I desire to avail myself of such modifications and embodiments as fairly fall within the scope of the appended claims.

What I claim as new and desire to secure by Letters Patent is:

1. In an apparatus of the kind described, a horizontally extended housing, a feeding hopper connected at the top of the housing near one end thereof, a variably inclinable baffle plate arranged in said housing to receive the discharge from said hopper, an oppositely variably inclinable baffle plate in cooperative relation to said first mentioned plate, means to produce a blast of air and suction in said housing, said means comprising a blower at one end and a suction fan at the other end of the housing, means to vary the intensity of the blast and suction comprising an inwardly opening damper controlling a transverse opening in the top wall of the housing, a series of bins at the bottom of the housing, a variably inclinable element beneath said baffle plates to receive and convey rock particles to the first of said series of bins, a vertically adjustable partition member serving as a baffle wall and as a part of the controlling means for the regulation of the air blast through the housing whereby to remove dust from the material and effect a separation of the particles of mica and the deposit of the same in the respective bins in different grades of fineness.

2. An air blast classifying device of the kind described, comprising a housing having an air blast producing blower at its forward end and air suction means at its opposite end, externally communicable valve means on said housing for varying the intensity of the air blast through the housing, a forwardly and downwardly inclined baffle element in the upper portion of said housing above the effective path of the air blast to initially receive thereon the material to be treated, a rearwardly and downwardly inclined baffle arranged in cooperative relation to the lower end of said first mentioned baffle to receive the material therefrom, the lower end portion of said second mentioned baffle extending into the path of the air blast, additional inclined baffles to successively receive the material from said second mentioned baffle subject to the action thereon of the air blast, and means for adjusting the angular relation of said baffles, said housing having bins correlated respectively to said mentioned additional baffles whereby to receive the material gravitated therefrom in different grades.

3. An air blast classifying device of the kind described, comprising a housing provided with a plurality of longitudinally alined bins in the lower portion thereof, a plurality of variably adjustable baffle plates arranged in oppositely inclined cooperative relation in the forward upper portion of the housing to initially receive the material to be treated, means to produce a blast of air through the housing below said baffles, said means comprising a blower at the forward end of the housing and a suction fan at the opposite end thereof, variably inclinable grading elements arranged in the housing respectively above said bins whereby to deliver the graded material to the bins, said variably inclinable grading elements being in the effective range of the air blast, and vertically movable means within the housing in cooperative relation to said grading elements for regulating the effective working range of the air blast.

4. In an air blast separating device for the preparation of mica products from scrap material, a housing, a feeding hopper, an angularly adjustable baffle plate arranged within the housing to receive material from said hopper, a second baffle plate arranged to receive material gravitating from said first mentioned baffle plate, an angularly adjustable sloping plate arranged to receive material gravitating from said second mentioned baffle plate, a vertically adjustable plate arranged in cooperative relation to said angularly adjustable sloping plate with a space therebetween, means for creating an air blast through said housing, means for varying the intensity of the air blast in said housing, and means for separately receiving the material as graded on said angularly adjustable sloping plate by the action of the air blast.

CONRAD L. JOHNSON.